United States Patent [19]
Gerich

[11] 3,739,643
[45] June 19, 1973

[54] BIMETALLIC SNAP DISC OR THE LIKE
[75] Inventor: Anton J. Gerich, Mansfield, Ohio
[73] Assignee: Therm-O-Disc Incorporated, Mansfield, Ohio
[22] Filed: Dec. 6, 1971
[21] Appl. No.: 204,882

Related U.S. Application Data
[63] Continuation of Ser. No. 859,853, Sept. 22, 1969, abandoned.

[52] U.S. Cl. ............... 73/378.3, 73/363.5, 337/111
[51] Int. Cl. ..................... G01k 3/12, G01k 5/70
[58] Field of Search.................. 73/378.3, 362.6, 73/363.5; 74/100 PD; 337/348, 379, 111, 135, 368, 347; 92/104

[56] References Cited
UNITED STATES PATENTS
2,913,008  11/1959  Cordero............................ 92/104
2,697,448  12/1954  Gates................................. 92/104

FOREIGN PATENTS OR APPLICATIONS
579,243  3/1930  Germany........................... 73/378.3
579,289  7/1946  Great Britain..................... 92/104

*Primary Examiner*—Donald O. Woodiel
*Assistant Examiner*—Daniel M. Yasich
*Attorney*—Harold F. McNenny, Donald W. Farrington, John F. Pearne et al.

[57] ABSTRACT

A snap disc is disclosed having peripherally spaced radially extending scallops which stiffen the disc independently of the chord height of the disc. Because of the stiffening scallops it is not necessary to utilize a large chord height when manufacturing a disc for high force or temperature operation. The disc, when formed of bimetal, can operate at high or low temperatures with a narrow temperature differential of operation. Tools for forming the disc with scallops are also disclosed.

12 Claims, 9 Drawing Figures

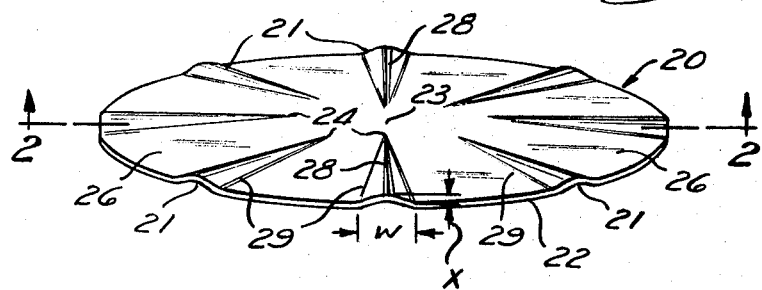
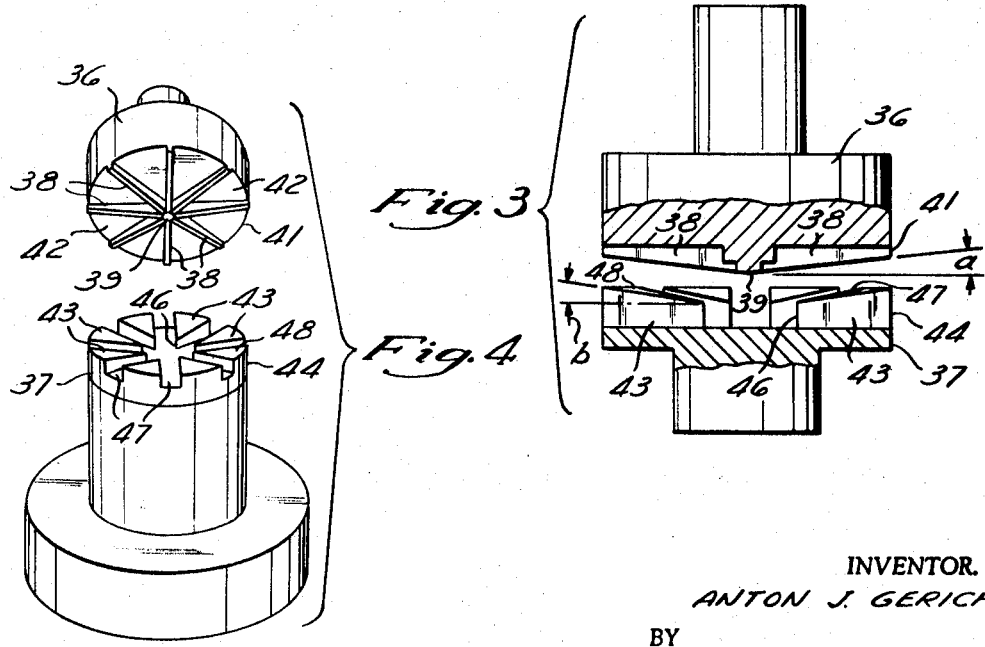
INVENTOR.
ANTON J. GERICH
BY
McNENNY, FARRINGTON, PEARNE & GORDON
ATTORNEYS

INVENTOR.
ANTON J. GERICH
BY
MCNENNY, FARRINGTON, PEARNE & GORDON

ATTORNEYS

BIMETALLIC SNAP DISC OR THE LIKE

This is a continuation of my copending application, Ser. No. 859,853, filed Sept. 22, 1969 now abandoned.

BACKGROUND OF THE INVENTION

This invention relates generally to snap discs and more particularly to a novel and improved snap disc and to a novel and improved method and apparatus for manufacturing such discs.

PRIOR ART

In the past, snap discs have been formed with radially extending corrugations extending from a location adjacent to the periphery of the disc to an opening formed in the center of the disc. An example of such a disc is illustrated in the U.S. Letters Pat. to Spencer, No. 1,895,591. Because of the corrugated structure, such discs provided a substantial amount of disc material and a substantial amount of movement between the two positions of stability. Other patents illustrating similar disc-type structures include the U.S. Letters Pat. Nos. 1,895,590; 1,972,172; 1,983,823; 2,001,553; and 2,072,847.

More recently, snap discs, whether bimetallic or monometallic, have been formed by stretching the central part of a flat disc of metal to form a dished disc having a shape generally similar to a portion of a sphere. Such discs are generally formed by a "bumping" process wherein the disc is placed in a female die which supports the disc at its periphery and a punch having a spherical end is pressed against the center of the disc to stretch the metal and form a dish shape. Examples of such discs are illustrated in the U.S. Letters Pat. Nos. 2,717,936; and 2,954,447. Generally, the snap movement of such non-corrugated discs is not as great as the snap movement of the prior corrugated type discs. However, such disc can usually be made with higher degrees of operating accuracy.

Snap discs are often formed of a monometallic material. Such snap discs are often used in fluid operated switching devices and other mechanisms requiring a snap action. When a bimetallic material is used to form a disc, it is temperature responsive and the lateral force for causing the snapping of the disc is provided, at least in part, by the differential expansion and contraction of a bimetallic material. Bimetallic snap discs are often used in thermostats to provide both the temperature response and the snap action. The present invention is particularly applicable for bimetallic snap discs. However, in certain of its broader aspects, this invention is also applicable to monometallic snap discs.

A bimetallic snap disc has two positions of stability. When the temperature of the disc is below one predetermined temperature, determined by the manufacture of the disc, it is in one of the positions of stability. When the temperature of the disc is raised to a second predetermined temperature, the disc snaps through to a second position of stability and remains in such second position of stability so long as the temperature of the disc remains at or above the second predetermined temperature. If the temperature of the disc is then lowered to the first predetermined temperature, it snaps back through to its first position of stability.

The difference in temperature between the two snap temperatures is the differential temperature of the disc. Generally speaking, it is difficult to manufacture simple dish shaped bimetallic snap discs for operation at either high or low temperatures without producing a disc which has a relatively wide differential temperature. This is because the chord height for a given disc material must be increased in a typical disc to provide sufficient strength or rigidity to resist the high thermally induced force created by either high or low temperatures. However, the chord height also tends to determine the differential in lateral forces required to return the disc to its initial position and hence large chord heights cause relatively wide differential temperatures in the disc.

In the past various approaches have been developed in attempting to overcome this problem and to permit the manufacture of high temperature or low temperature discs having relatively low differential temperatures. One approach is to use a thicker metal so that the disc has sufficient strength to resist the thermally induced force without requiring the use of a large chord height. Another approach to the problem is to use a bimetallic material which is less active (that is, a material having a smaller differential expansion rate between the two metals) for forming the disc so that the thermally induced forces at a given high or low temperature is not as great.

The first approach of using a thicker metal is undesirable in many instances since it tends to increase the cost of the material forming the disc and increases the likelihood of the fatigue failure when the disc is repeatedly cycled. The second approach of using a less active bimetallic material tends to produce difficulty by making the manufacture of the disc very critical since the thermally induced forces available for operating the discs are small and very slight variations in the disc form materially alter the operating characteristics of the disc.

Both of these approaches reduce the problem of forming high or low temperature low differential temperature discs to some extent. However, even when one or more of these approaches are utilized, it has been found that it is almost impossible to commercially manufacture bimetallic snap discs for operation at high or low temperatures with low differential temperatures of operation. For example, in the past, even when utilizing one or more of the approaches described above, a bimetallic disc which snaps at a temperature in the order of 350°F. will have a differential temperature of operation in the order of about 120°F. So it will snap back at a temperature in the order of 230°F.

SUMMARY OF INVENTION

A bimetallic snap disc in accordance with this invention can be manufactured to operate at relatively high temperatures with relatively low differential temperatures without requiring the use of special materials, or materials of special thickness. For example, snap discs in accordance with this invention have been manufactured from a standard bimetal having an operating temperature of about 340°F. and a differential temperature of less than 10° F. One such disc snapped in one direction at a temperature of 348°F. and back to its initial position when the temperature dropped to 340°F.

The disc in accordance with this invention is shaped so that the stiffness is obtained without excessive chord height. This stiffness, in the illustrated embodiments, is obtained by forming shallow scallops in the disc which extend from the edge at peripherally spaced locations toward the center of the disc. These scallops provide disc stiffness without excessive chord height. Therefore, a disc in accordance with this invention has a relatively low chord height and consequently, a relatively low differential temperature, even though it provides sufficient rigidity or stiffness to resist relatively high thermally induced forces. A monometallic disc in accordance with this invention is also desirable since such disc can withstand a relatively large lateral force before snapping without requiring a large differential in the lateral force before it snaps back to its initial position.

BRIEF DESCRIPTION OF THE DRAWINGS

FIG. 1 is a perspective view of a snap disc in accordance with the first embodiment of this invention;

FIG. 2 is a cross section taken generally along 2—2 of FIG. 1;

FIG. 3 is a side elevation partially in section illustrating one pair of dies which may be utilized to form a disc of the type illustrated in FIGS. 1 and 2;

FIG. 4 is a perspective view of the dies illustrated in FIG. 3;

Figure 8:
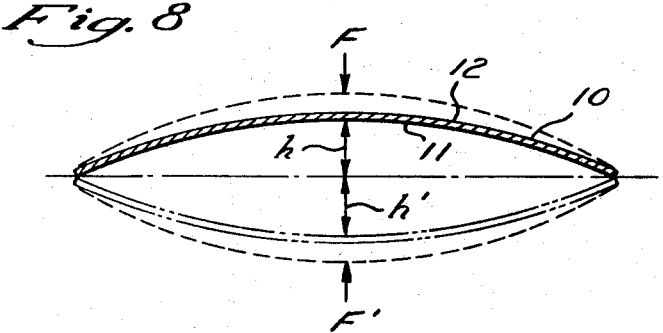
FIG. 8 is a side elevation in section illustrating a typical prior art snap disc with one position of stability illustrated in full line and the other position of stability illustrated in phantom.

Referring first to FIG. 8, a typical prior art snap disc whether bimetallic or monometallic, has a shape substantially as illustrated in FIG. 8 in full line. Such disc is circular and, in some instances, is provided with a small centrally located aperture therethrough. Discs of this type are generally formed by "bumping" a flat circular disc, to stretch the material of the disc and form the concave structure illustrated in full line in FIG. 8.

Generally, when the disc is formed of bimetal and is intended to operate at a temperature above ambient temperature, the disc is bumped on the high expansion side 11. The depth of penetration of the punch in the bumping operation tends to determine the upper temperature of operation of the disc.

The disc 10 is illustrated in full line in one of its positions of stability. Assuming this disc is bimetal and is intended for operation at a temperature above ambient temperature, the high expansion side is located on the surface 11 and the low expansion side is along the surface 12. As the temperature of the disc is raised to approach its upper operating temperature, the disc moves with creep action from the upper dotted line position to the full line position, the position which is considered herein to be a first position of stability. As soon as the temperature of the disc reaches its upper predetermined temperature of operation, the disc moves with snap action to the downward dotted line position. If the temperature of the disc is raised to still a higher temperature, the disc moves with creep or slow movement toward conditions of even greater downward concavity.

As the temperature of the disc is reduced and as the temperature approaches its lower predetermined temperature of operation, the disc moves toward its second position of stability indicated in phantom. As the temperature of the disc is reduced below the second or lower predetermined temperature of operation, the disc snaps back to the upper dotted line position. Here again, if the temperature is decreased still further, the disc moves with creep movement beyond the upper dotted line position. For purposes of simplification, the two positions of stability may be considered to include the adjacent positions assumed by the disc with creep action. However, the chord height discussed herein is the chord height to the inner concave surface of the disc which is present when the disc is in one position of stability, and is about to snap to the other position of stability. Therefore, the chord height $h$ is the chord height of the disc when the disc is in the first position of stability, but is about to snap through to the second position of stability. Similarly, the chord height $h'$ is the chord height of the disc to the inner or concave surface when the disc is in the second position of stability, but is about to snap through to its first position of stability. The chord height $h$ is substantially equal to the chord height $h'$.

To a great extent, the temperature at which the disc snaps from the first position to the second position is determined by the chord height $h$ and $h'$. The thermally induced force F tending to cause the disc to snap to the second position of stability is a function of temperature caused by differential expansion between the high expansion side 11 of the disc and the low expansion side 12 thereof. At higher temperatures, the force F is greater and the chord height must be greater to resist the force and prevent premature snap action. After the disc is snapped through to the second position of stability, the disc has a chord height of $h'$. As the temperature of the disc drops, the force F tending to maintain the disc in the second position of stability, decreases. If the chord height $h'$ is small, the disc tends to snap back to the first position of stability even though a downward force F still exists. In such a disc, a relatively low differential temperature may exist. However, when the disc is provided with a large chord height $h$, it tends to have a similar large chord height $h'$. Therefore, such a disc tends to remain in the second position of stability and may remain in such second position until the temperature drops to a sufficiently low value to cause the direction of thermally induced force to reverse, as illustrated by F', before the disc snaps back to its first position of stability. Since the chord height $h$ must normally be relatively large when the disc is intended to operate at high temperatures, and since the chord height $h'$ tends to approach the chord height $h$, high temperature discs usually have a relatively wide differential temperature of operation.

Figure 9:
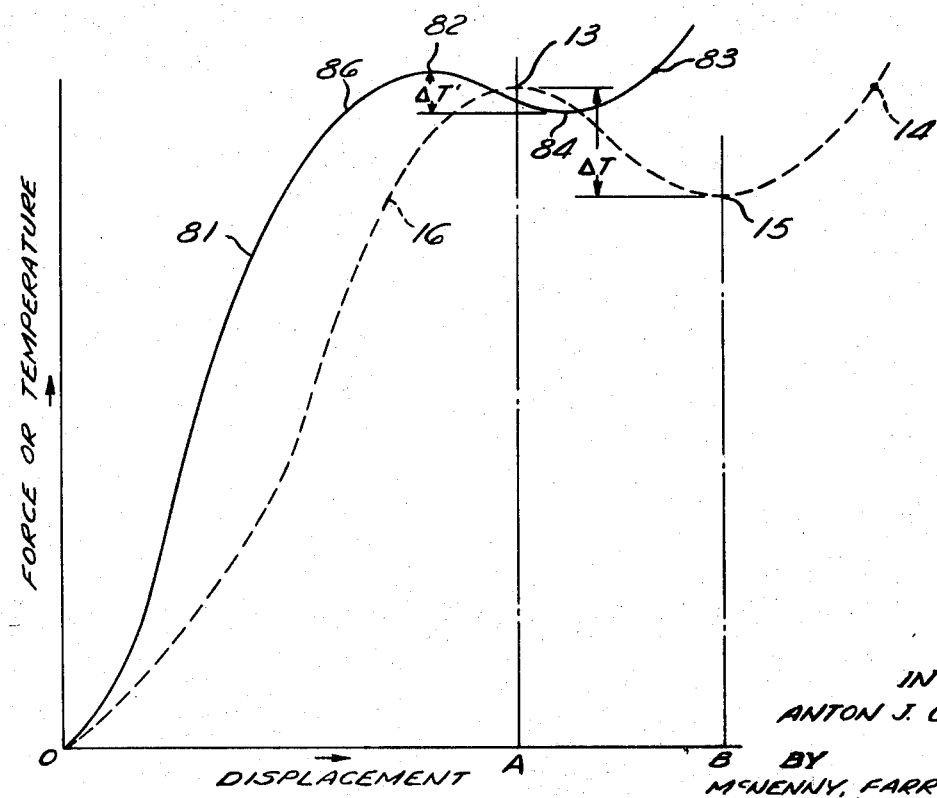
FIG. 9 is a force displacement curve illustrating the operation of a typical prior art disc and an improved disc in accordance with this invention.

The dotted curve in FIG. 9 illustrates a typical displacement curve of a prior art snap disc of the type illustrated in FIG. 8. In this curve, the vertical direction represents force and the horizontal direction represents displacement. When the disc is formed of bimetal, the force is produced thermally and the vertical direction may be considered to be temperature since the thermally induced force tending to snap the disc is a function of temperature.

Assuming the disc is bimetal, as the disc temperature is raised from normal room temperature to its upper operating temperature it follows the curve from zero to the point 13. The disc moves with creep movement to a displacement position A which corresponds to the point 13 and represents the first position of stability reached immediately before the disc snaps. On increasing temperature, the disc then moves with snap action to the position 14. If the temperature of the disc is raised still further, it moves up along the curve past the position 14. However, if the disc temperature is then reduced, the disc moves with creep action to the second position of stability 15 represented by the displacement position B. On decreasing temperature the disc then snaps to the position 16.

The difference in temperature between the temperature at the point 13 and the temperature at the point 15 represents the differential temperature or the $\Delta T$ of the disc. Generally speaking, as the chord height is increased, the $\Delta T$ or difference in temperature of operation between the points 13 and 15 increases drastically. The solid line curve in FIG. 9 illustrates the curve of operation for a typical disc in accordance with the present invention. This curve will be discussed in detail below.

Referring to FIGS. 1 through 4, one embodiment of this invention is a disc 20 formed with tapered scallops 21 extending from the edge of the disc 22 toward the center of the disc 23. In the disc 20 there are eight scallops 21 which are symmetrically located around the periphery of the disc. These scallops 21 extend inwardly toward the center but terminate at points 24 spaced from the center 23 of the disc. The scallops 21 in the disc 20 are wedge shaped and tapered from a maximum width $w$ at the edge 22 to a substantially zero width at 24. Similarly, the height of the scallops 21 is at a maximum height $x$ at the edge 22 and the height $x$ decreases to substantially zero at the point 24. In this embodiment, the width $w$ of the scallops 21 is arranged so that the scallops 21 are spaced from each other by smoothly dished intermediate sections 26 of the disc. Since the disc 20 is provided with eight scallops 21, the width $w$ is substantially less than one-eighth of the peripheral length of the disc.

As best illustrated in FIG. 2, the disc 20 is also dished upwardly a distance $h$ from a reference plane 27 so the principal chord height of the disc is represented by the distance $h$. The height $h$ is exaggerated for purposes of illustration in FIG. 2. It should be noted however, that the height $x$ of the scallops 21 is less than the chord height $h$ so that even the material along the ridges 28 is curved upwardly toward the center 23 of the disc. In most instances, the ridges 28 are formed by sharper bends than the roots 29 where the scallops blend into the intermediate sections 26. The ridges 28 and roots 29 should not be sharp enough to produce sufficient stress concentrations to produce fatigue failure in the disc.

When the disc snaps from its upward or first position of stability, illustrated in full line in FIG. 2, to its lower or second position of stability illustrated in phantom in FIG. 2, the scallops 21 provide stiffness tending to resist such movement. After snapping through to its lower or second position of stability, the disc has a chord height of $h'$ which is substantially equal in size to the chord height $h$, but tends to be slightly smaller since the scallops 21 tend to provide a continuing force urging the disc back toward its first or upper position of stability.

Since the disc tends to remain in the first position of stability when lateral forces are not applied, a downward force represented by the arrow F is required to move the disc to its second or lower position of stability. Once it moves to the lower position of stability, it remains in such position as the force F reduces. However, since the chord height $h'$ is small, it tends to snap back to its first position of stability when the force thereon is still in a downward direction, but has a lower value represented by the force F'. The difference in absolute value between the forces F and F' determine the temperature differential of operation when the snap disc is formed of bimetal or the differential of force when the disc is formed of a monometallic material.

For example, if the disc is intended for high temperature operation, the lower side 31 of the disc is the high expansion side of the bimetal and the upper side 32 is the low expansion side. As the temperature of the disc increases, the value of the thermally induced force in the downward direction increases until a force having a value F is reached. At this time, the disc snaps through to the lower position of stability and remains in that position so long as the force has a value greater than the force F'. Since the thermally induced force in this instance is the function of temperature and since the absolute value of the force F' is almost as great as the absolute value of the force F, the disc tends to snap back to its initial position when the disc temperature is reduced only a relatively small amount. When a low differential temperature of operation is required, the chord heights $h$ and $h'$ are arranged to be small, and the principal structure for resisting snap action is provided by the rigidity of the scallops 21. In most instances the disc has a relatively low differential temperature when the chord heights $h$ and $h'$ are less than about one percent of the disc diameter. (For example, a chord height of 0.010 inch for a one inch disc.) If increased stiffness is required for higher temperature operation, the height $x$ of the scallops can be increased, the length of the scallops can be increased so that they extend closer to the center 23, or the disc can be formed with a greater number of scallops. In this way, the stiffness of the disc can be increased without increasing the chord height. Therefore, it is possible to manufacture discs for a higher temperature of operation without increasing the chord height and without creating a disc having a large temperature differential in operation. In some instances the disc can be formed so that some of the scallops extend to the center and actually join opposite scallops.

When the disc is intended for low temperature operation the disc is formed so that the high expansion side is along the surface 32 and the low expansion side is along the surface 31. However, the function of the disc is similar to the function described above. When the disc is not intended to be temperature responsive and is formed of monometallic material, the forces F and F' can be applied to the disc in any desired manner, for example, by fluid pressure or by a linkage. However, the snap action between the two positions will occur with relatively small changes in the force level so the disc may be considered to have a low differential in operation.

FIGS. 3 and 4 illustrate one form of tooling which may be used to form the disc illustrated in FIGS. 1 and 2. This tooling includes a punch 36 and a die 37. The operating end face of the punch 36 is formed with eight ribs 38 which extend from the center 39 to the edge 41 of the punch. The ribs 38 are tapered back from the center 39 by an angle a with respect to a plane perpendicular to the punch axis. Between the ribs 38, the end face of the punch 36 is formed with relief sections 42.

The die 37 is provided with an end face formed with eight radially extending wedges 43 which extend inwardly from the periphery 44 of the die and terminate at ends 46 spaced from the central portion of the die. The wedges 43 are spaced from each other by grooves 47 formed in the end face of the die. The operating faces 48 of the wedges are formed at an angle b with respect to a plane perpendicular to the die axis and the angle b is slightly larger than the angle a.

When a flat disc is positioned in between the punch 36 and the die 37 and the punch is moved toward the die, the disc is first engaged by the punch at its center 39 and by the operating surfaces 48 at the periphery. As the punch penetrates into the disc, the disc material is stretched until it becomes generally dish shaped with an angle approaching the angle a. At this point, however, the disc still only engages the operating surfaces 48 substantially at their periphery. Further continued movement causes the outer portions of the ribs 38 to enter the spaces 47 between the wedges 43 to form the scallops. Therefore, the formation of the scallops commences at the periphery and the maximum scallop height x occurs at the periphery.

It has been found that a disc may be formed with a single bumping with these tools from only one side, and that such disc can be a snap disc in that it has two positions of stability and moves between them with snap action. If desired, however, the disc may be subsequently bumped from the other side preferably with a normal spherical tool and a cooperating die which supports the disc at its periphery. This secondary bumping tends to increase the operating temperature differential to the desired level.

Figure 5:
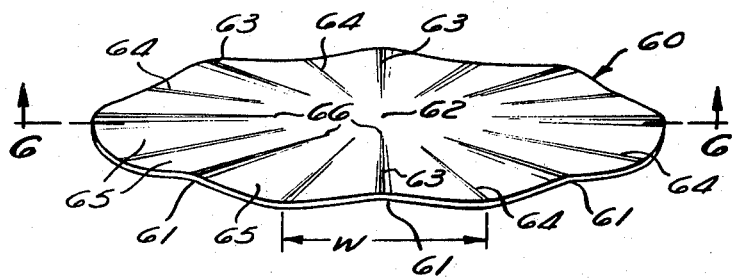
FIG. 5 is a perspective view of a snap disc in accordance with a second embodiment of this invention wherein the entire periphery is formed with scallops.
Figure 6:
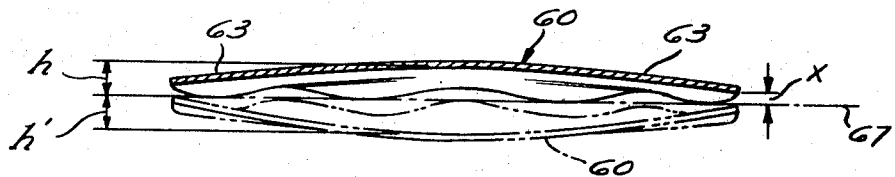
FIG. 6 is a cross section taken generally along 6—6 of FIG. 5.

FIGS. 5 and 6 illustrate another embodiment of the snap disc incorporating this invention. The disc 60 of this embodiment is formed with scallops 61 which have sufficient width to join each other without intermediate flat sections. In the disc 60 there are again eight scallops which extend from the edge of the disc toward the center 62, but terminate at locations 66 spaced from the center. Since the scallops 61 are shaped so that when each scallop joins with the adjacent scallop, the width of the scallop w at the edge of the disc is equal to the chord width of one-eighth of the disc periphery. Each of the scallops includes a ridge bend 63 and a pair of root bends 64. The scallops 61 have a height x which is a maximum adjacent to the edge of the disc and tapers to a zero height at the inner ends 66 of the scallops. Here again, even the ridges 63 are curved slightly since the height x is lees than the chord height h of the disc. In FIG. 6 the height h is again exaggerated for purposes of illustration.

The angle of the root bends 64 with respect to the reference plane 67 is greater than the angle of the ridges 63 and the central portion of the disc inwardly of the ends 66 of of the scallops 61 is generally smooth having a dish shape which is approximately spherical.

When the disc 60 snaps through from the first position of stability, illustrated in full line in FIG. 6, to the second position of stability, illustrated in phantom, it has a chord height $h'$ which is substantially equal to the chord height $h$. Since the side walls 65 of the scallops of this embodiment are not as steep, the rigidity provided thereby tends to be less than the embodiment of FIGS. 1 and 2. The operation of the disc is similar, however, to the disc of the embodiment of FIGS. 1 and 2 in that a disc of the embodiment of FIGS. 5 and 6, formed of bimetal, can be manufactured for relatively high or low temperature operation with a low differential temperature of operation. Similarly, a monometallic disc in accordance with the embodiment of FIGS. 5 and 6 can be manufactured to require a relatively large operating force with a relatively small differential force in operation.

Figure 7:
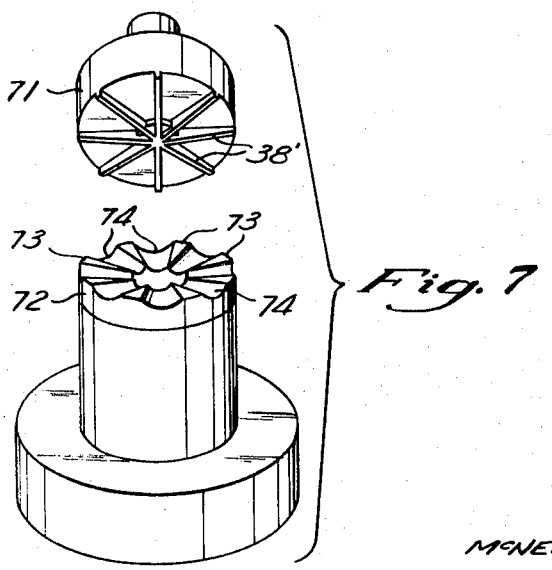
FIG. 7 is a perspective view of a die set which may be used to manufacture a disc of the type illustrated in FIGS. 5 and 6.

The disc illustrated in FIGS. 5 and 6 can be manufactured on a die set as illustrated in FIG. 7. The punch 71 is formed with an end face with narrow ridges 38' similar to the punch 41 of FIG. 4. However, the die 72 is formed with narrower wedge faces 73 and wider relief spaces 74. The wedge faces 73 are quite narrow so the roots 64 of the scallops are relatively sharp. Since the disc is not supported over a substantial area, the intermediate sections are not formed by the die set of FIG. 7. Here again, the wedge faces 73 extend toward the center of the die, but terminate at a location spaced therefrom. Also, the angle of the die faces 73 with respect to the plane perpendicular to the axis of the die 72 is steeper than the angle of the ribs 38' of the punch 71 with respect to the plane perpendicular to the punch axis. Therefore, the scallops have a maximum depth or height x at the edge of the disc and have decreasing height x as they extend toward the center of the disc. The dies of both embodiments form the scallops primarily by stretching the metal and do not materially change the disc diameter.

Here again, a snap disc can be formed with the die set of FIG. 7 by a single bumping operation. However, bumping with a conventional spherical punch in a conventional peripheral supporting die in the opposite direction may be utilized to increase the differential temperature of operation to a desired value. It has been found that the force of a disc in accordance with this embodiment is slightly less than the force of a disc having similar operating temperatures, but formed in accordance with the embodiment of FIGS. 1 and 2.

Referring again to FIG. 9, the solid line curve 81 represents the force or temperature displacement curve of a typical disc incorporating this invention. In this disc, the disc moves with creep action from the zero point to the point 82 on increasing force, or temperature in the case of a bimetallic disc. At the position of stability at 82, further increases in temperature or force causes the disc to snap to the point 83. On decreasing temperature or force, the second position of stability is reached at 84 and the disc snaps back to the point 86. In such discs, the differential temperature of operation or the differential force is represented by $\Delta T'$. A comparison of the two curves will illustrate the differential temperature of operation is much less even though the disc is a higher temperature disc than the conventional disc illustrated in the dotted line. It appears that a disc formed with a shape in accordance with this invention has a positive spring rate superimposed on the normal spring rate of a conventional disc of the type having a curve, as illustrated by the dotted line.

Although the two illustrated embodiments each have eight scallops, discs may be formed with greater or lesser numbers of scallops. Generally, smaller diameter discs are formed with a smaller number of scallops than larger diameter discs.

Since a bimetallic snap disc in accordance with this invention can be manufactured for high or low temperature operation with a relatively small differential temperature of operation without using thick bimetallic material, fatigue failures are not a problem. Also, a relatively active bimetallic material of the type used for conventional dies can be utilized Because the disc can be made without the use of special materials, inventory costs for manufacture are reduced and in many instances, discs can be made which were difficult or impossible to commercially manufacture with conventional prior art practices.

Although preferred embodiments of this invention are illustrated, it is to be understood that various modifications and rearrangements may be resorted to without departing from the scope of the invention disclosed.

What is claimed is:

1. A snap disc comprising a piece of metal, said metal being dished to provide a dished portion of shallow concavity which is substantially symmetrical about its center, said dished portion being formed with a plurality of tapered shallow scallops spaced around the periphery of said portion and converging generally radially from said periphery toward said center to inner ends, said disc being movable with snap action between two positions of stability in which said disc has opposite concavity, said scallops increasing the stiffness of said disc when compared to a similar disc without scallops and substantially increasing the disc's resistance to movement from one of said positions toward the other of said positions, said scallops being substantially wedge shaped and tapered substantially uniformly from a maximum width at said periphery to a minimum width at said inner ends and tapered substantially uniformly from a maximum height at said periphery to substantially zero height at said inner ends, said inner ends of said scallops blending into and being spaced from each other by a smoothly dished central portion.

2. A snap disc as set forth in claim 1 wherein said scallops are formed by opposed substantially planar side walls joined together at the ridge bend and joined to the adjacent portions of said metal opposite said ridge bends at root bends.

3. A snap disc as set forth in claim 2 wherein said scallops are tapered substantially uniformly to substantially zero width at said inner ends, said side walls are substantially triangular, each root bend of each scallop is spaced from the adjacent root bend of the adjacent scallop.

4. A snap disc as set forth in claim 2 wherein each scallop is joined along its edges to the adjacent scallop.

5. A snap disc comprising a piece of metal, said metal being dished to provide a dished portion of shallow concavity which is substantially symmetrical about its center, said dished portion being formed with a plurality of tapered shallow scallops spaced around the periphery of said portion and extending generally radially toward said center to inner ends, said disc being movable with snap action between two positions of stability in which said disc has opposite concavity, said scallops increasing the stiffness of said disc when compared to a similar disc without scallops and substantially increasing the disc's resistance to movement from one of said positions toward the other of said positions, said scallops being substantially wedge shaped and tapered substantially uniformly from a maximum width at said periphery to a minimum width at said inner ends and tapered substantially uniformly from a maximum height at said periphery to substantially zero height at said inner ends, said metal being bimetal and said snap disc snaps between said positions of stability in response to changes in the temperature thereof.

6. A snap disc as set forth in claim 5 wherein said scallops are formed by opposed substantially planar side walls joined together at the ridge bend and joined to the adjacent portions of said metal opposite said ridge bends at root bends.

7. A snap disc as set forth in claim 6 wherein said scallops are tapered substantially uniformly to substantially zero width at said inner ends, said side walls are substantially triangular, each root bend of each scallop is spaced from the adjacent root bend of the adjacent scallop.

8. A snap disc as set forth in claim 6 wherein each scallop is joined along its edges to the adjacent scallop.

9. A snap disc as set forth in claim 5 wherein said disc is imperforate and said inner ends of said scallops are spaced from each other by a smoothly dished central portion.

10. A snap disc as set forth in claim 5 wherein said inner ends of said scallops are spaced from each other by a smoothly dished portion of said disc.

11. A snap disc comprising a generally circular piece of bimetal dished to a shallow concavity which is substantially symmetrical about the center thereof, said bimetal being formed with a plurality of tapered shallow scallops spaced around the periphery thereof extending generally radially toward the center of said disc to inner ends, said disc being movable with snap action between two positions of stability in which said disc has opposite concavity, said scallops increasing the stiffness of said disc when compared to a similar disc without scallops and substantially increasing the disc's resistance to movement from one of said positions toward the other of said positions, said scallops providing a maximum stiffness at said periphery and a stiffness which decreases substantially uniformly to said inner ends, said scallops being substantially wedge shaped and tapered substantially uniformly from the maximum width of said periphery to a minimum width at said inner ends and tapered substantially uniformly from a maximum height at said periphery to a substantially zero height at said inner ends.

12. A snap disc as set forth in claim 11 wherein said maximum height of said scallops is substantially less than the chord height of the dish in said disc.

* * * * *